July 5, 1949.

T. O. MEHAN 2,475,510

TOTAL TAKING CONTROL

Original Filed July 4, 1939

Inventor
Thomas O. Mehan
By Hinkle, Horton, Ahlberg, Hensmann & Wipper
Attorneys.

July 5, 1949.　　　　　T. O. MEHAN　　　　　2,475,510
TOTAL TAKING CONTROL
Original Filed July 4, 1939　　　　　5 Sheets-Sheet 2
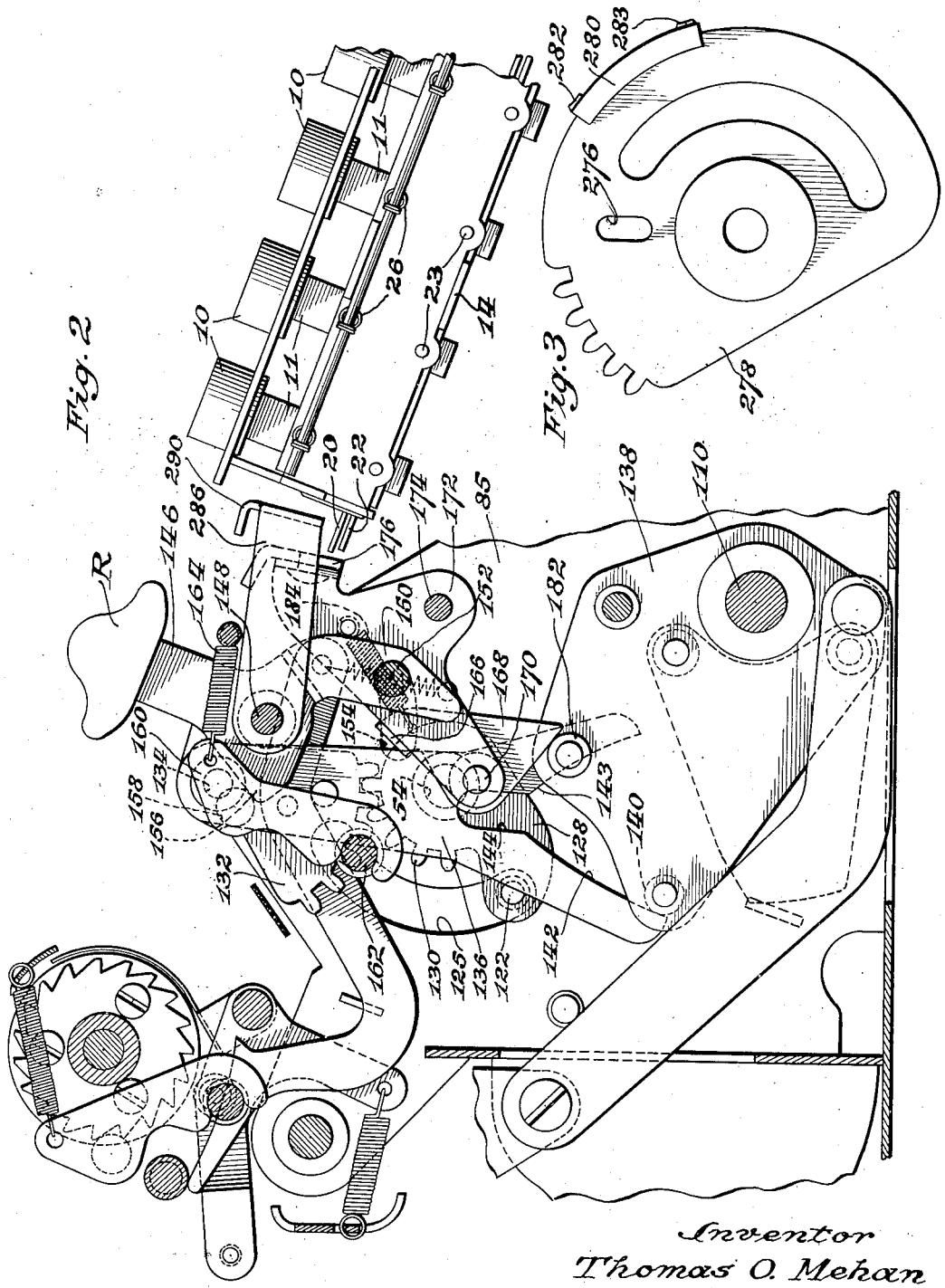
Inventor
Thomas O. Mehan
By Hinkle, Horton, Ahlberg, Hammann & Wupper
Attorneys.

July 5, 1949.
T. O. MEHAN
2,475,510
TOTAL TAKING CONTROL
Original Filed July 4, 1939
5 Sheets-Sheet 3
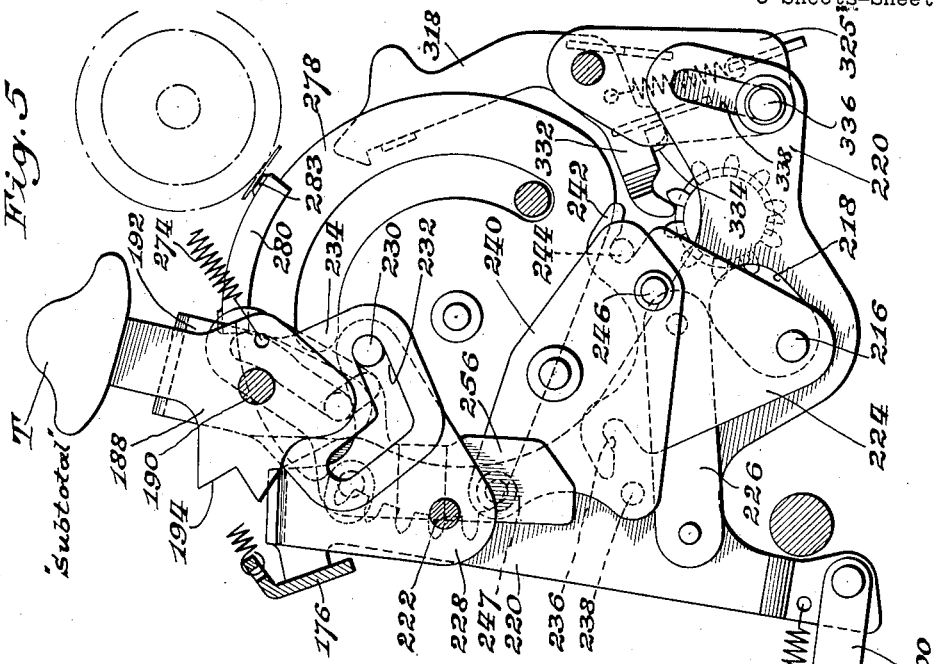
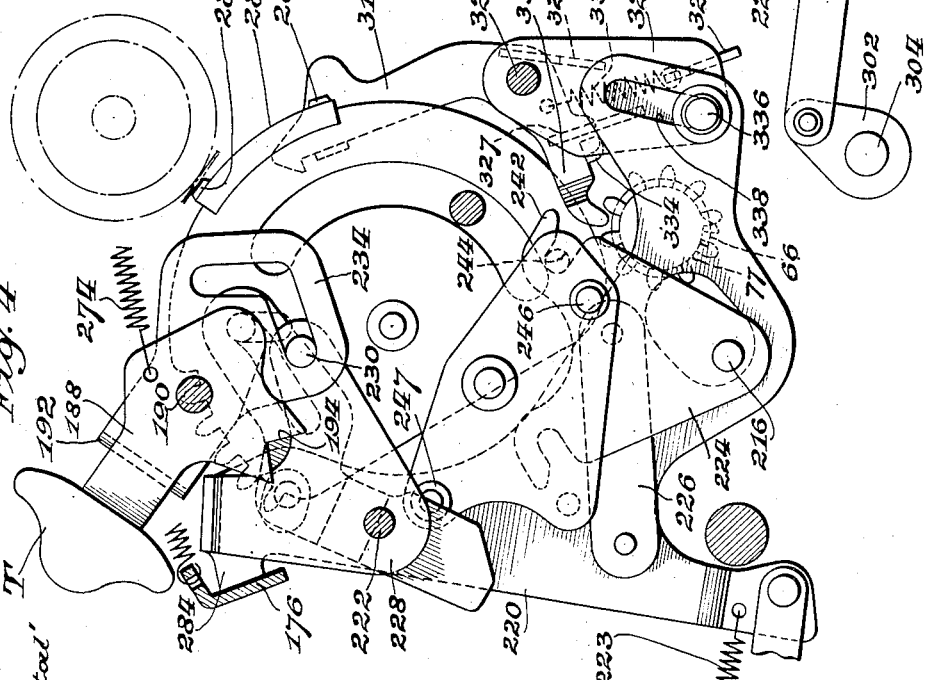
Inventor
Thomas O. Mehan
By Hinkle, Horton, Ahlberg, Hausmann & Wapper
Attorneys.

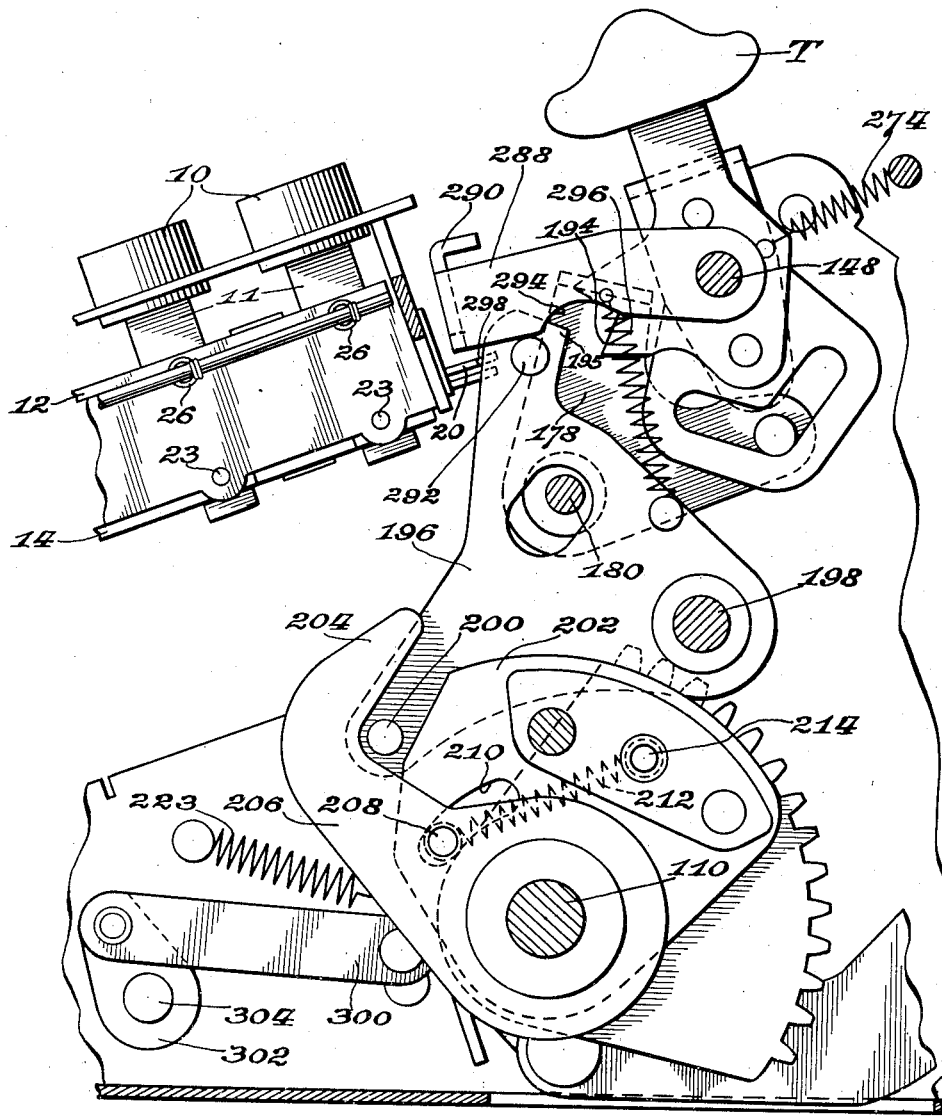

Patented July 5, 1949

2,475,510

UNITED STATES PATENT OFFICE 2,475,510

TOTAL TAKING CONTROL

Thomas O. Mehan, Park Ridge, Ill., assignor to Victor Adding Machine Co., Chicago, Ill., a corporation of Illinois Original application July 4, 1939, Serial No. 282,787. Divided and this application July 15, 1946, Serial No. 683,804

3 Claims. (Cl. 235—60.31)

1

My invention relates generally to adding machines, and more particularly to manually operated controls therefor, to determine the character of the operating cycle to be performed.

An object is to provide an improved control key which has a normal position and two operative positions, respectively, for causing the machine to execute totaling and subtotaling operations, and in which the numeral keys are released by movement of the key to either of said positions.

Other objects will appear from the following description, reference being had to the accompanying drawings, in which:

Fig. 2 is a fragmentary longitudinal vertical sectional view of the left-hand portion of the machine, looking to the right;

Fig. 3 is a side elevational view of the signal printing segment;

Fig. 4 is a fragmentary sectional view taken on a vertical plane and looking to the left of the machine, showing the total and subtotal control key in total taking position;

Fig. 5 is a view similar to Fig. 4, showing the control key in subtotal taking position; and Figs. 6 and 7 are enlarged longitudinal sectional views showing the accumulator operating mechanism and the controls therefor.

This application is a division of my copending application Serial No. 282,787, filed July 4, 1939, which has since been abandoned.

Figure 1:
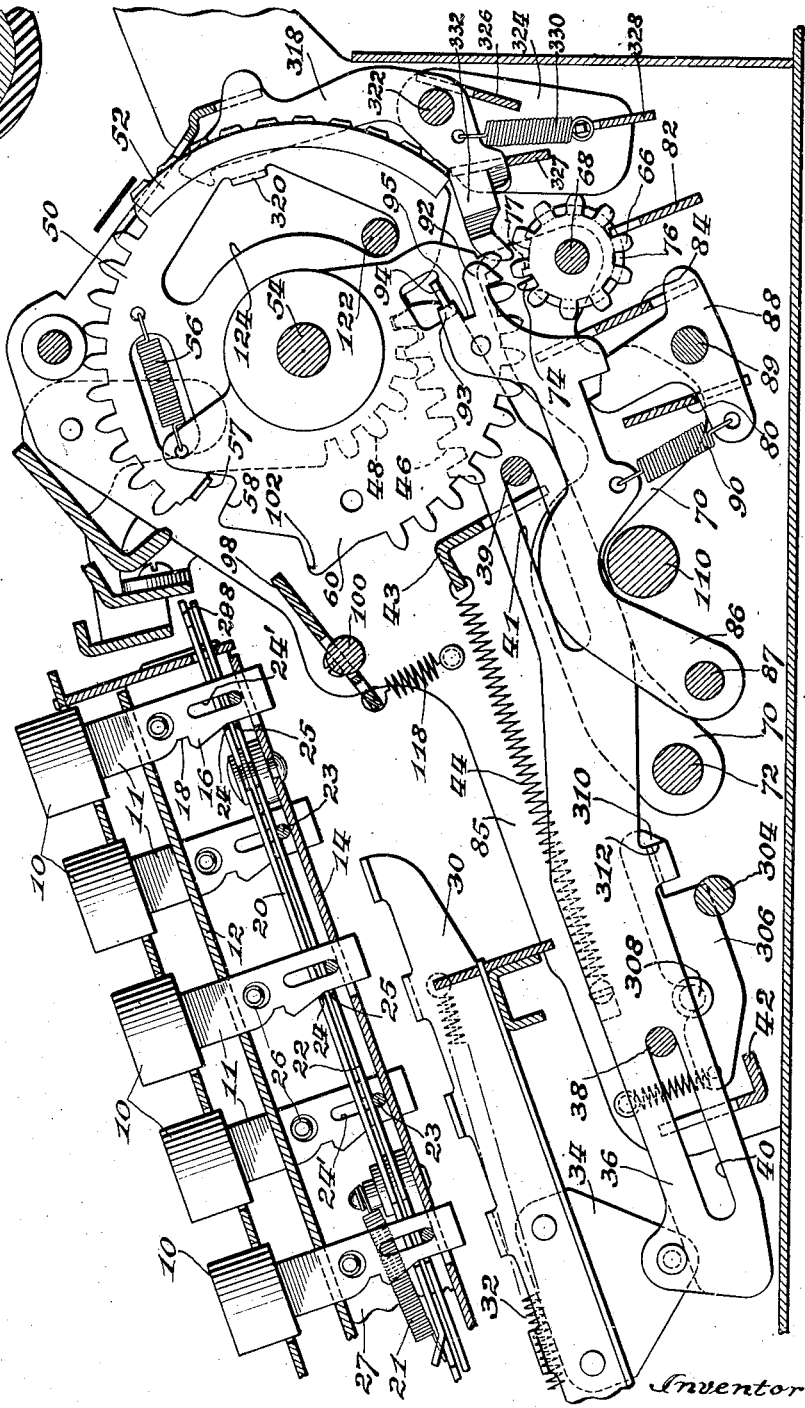
Fig. 1 is a fragmentary longitudinal vertical sectional view, looking toward the left, of the adding machine, showing particularly the transfer mechanism and the means for resetting the same.

Referring to Fig. 1, the adding machine is provided with a keyboard comprising a plurality of numeral keys 10 having stems 11 guided for vertical movement in slots formed in plates 12 and 14. Each of the key stems 11 is provided with a cam projection 16 and a notch 18 for cooperation with a longitudinally slidable latch bar 20 and a similarly movable actuator release bar 22, there being one bar 20 and one bar 22 for each longitudinal row of keys. The bars 20 are notched to provide shoulders 24 for engagement with the cam projections 16, alternate shoulders 24 being on opposite edges of the bars 20. Similarly, shoulders 25 for engagement with the cam surfaces of the projections 16 on the key stems are provided on the actuator release bar 22.

The bars 20 and 22 are resiliently held in their rearward positions by suitable springs, such as the spring 21 shown in Fig. 1, for holding one of the latching bars 20 in its rearward position.

2

When one of the keys 10 is depressed, its camming projection 16 successively cams the bars 20 and 22 forwardly until the projection 16 of the key stem passes beneath the latching bar 20, whereupon the spring operating the latter will move it into the notch 18 and thereby latch the key in depressed position in the customary manner. The strokes of the keys are limited by fixed rods 23, each of which passes through elongated slots 24' in the key stems 11 of a transverse row. The keys, when released by the latch bars 20, are returned to their normal positions by coil springs 26 which extend through suitable openings in the key stems 11 of a transverse row, are suitably anchored at their ends, and are supported intermediate longitudinal rows of keys by vertical separator plates 27 which also serve to join plates 12 and 14.

In a normal adding operation of the machine, the lower ends of such of the key stems 11 as have been depressed, are adapted to form stops to limit the rearward travel of actuator slides 30 which are suitably guided for longitudinal movement and may be drawn rearwardly by springs 32 in the customary manner after the slides have been released.

It will be understood that there is a slide 30 for each denominational order of the numeral keys 10, each of these slides being connected by a plate 34 with an actuator 36, the actuators being mounted for longitudinal travel on a pair of rods 38, 39 which extend through elongated slots 40 and 41, respectively, formed in the actuator, the actuators being suitably guided and spaced by combs 42 and 43. The actuator 36 for the highest denominational order is not connected to a slide and is therefore provided with a tension spring 44 for drawing it rearwardly (as will appear hereinafter) when a total or subtotal is taken.

The rearward end of each of the actuators 36 is provided with a rack 46 which is in mesh with a segmental pinion 48 formed on a type sector 50, the type sector having a row of type 52 bearing the type characters from "0" to "9" thereon.

The type segments 50 are mounted for rotation on a shaft 54 and adjacent each of these segments there is provided a sector gear 60, the teeth of which are adapted for engagement with accumulator pinions 66 mounted for rotation upon a shaft 68. Each of the segments 50 is connected to its associated gear 60 by a tension spring 56, the extent relative movement of these parts under the influence of the spring being limited by the engagement of a sidewardly extending lug 57 on the segment 50 with the portion 58 of the gear 60. The shaft 68 is secured at its ends to a pair of similar arms 70 pivoted on a rod 72 so that the accumulator pinions 66 may be swung into and out of engagement with the teeth of the gear sector 60. Each of the accumulator pinions has secured thereto a disc provided with a transfer cam tooth 74 and a disc 76 having a notch 77. The arms 70 are joined by a comb strip 80. The accumulator pinions 66, when in the normal position shown in Fig. 1, are held from accidental rotation by a toothed strip 82 rigidly secured to the vertical frame plates 83 and 85 of the machine.

A comb plate 84, likewise rigidly secured to the frame plates, forms guides for transfer pawls 86, pivoted on rod 87, and for pawl latches 88, pivoted on a rod 89. Springs 90 bias both the pawls 86 and their latches 88 for clockwise rotation. At the rearward end of each transfer pawl 86 there is a projection 92 for engagement with its associated transfer cam tooth 74, a notch 95, and a stop projection 93 for engagement with a lug 94 punched and bent sidewardly from the sector gear 60 of the next higher denominational order. Thus when a transfer pawl 86 is tripped, spring 56 rotates the gear sector clockwise a distance sufficient to cause its associated pinion 66 to be rotated through one-tenth of a revolution, thereby to effect the transfer or carry-over. A pawl 86 which has been tripped is held in tripped position by its latch 88, which swings clockwise when the pawl is tripped. Such movement is permitted since the comb 80 is raised when the accumulator pinions 66 are in mesh with the gear sectors 60.

The latches 88 are restored to normal position by the comb 80 as the accumulator is returned to normal position. A pawl 86 which has been tripped is held in tripped position by the lug 94 which then rests in the notch 95. The tripped pawls are permitted to return to normal position during the initial portion of the following cycle of operation by a plate 98 secured to a shaft 100. When the shaft 100 is rotated clockwise the plate 98 engages a projection 102 on each of the gear sectors 60 which has been operated to effect a transfer and rotates it counterclockwise sufficiently to withdraw its lug 94 from the notch 95 of the transfer pawl 86, so that the latter may be swung back to its normal position by its spring 90.

Figure 6:
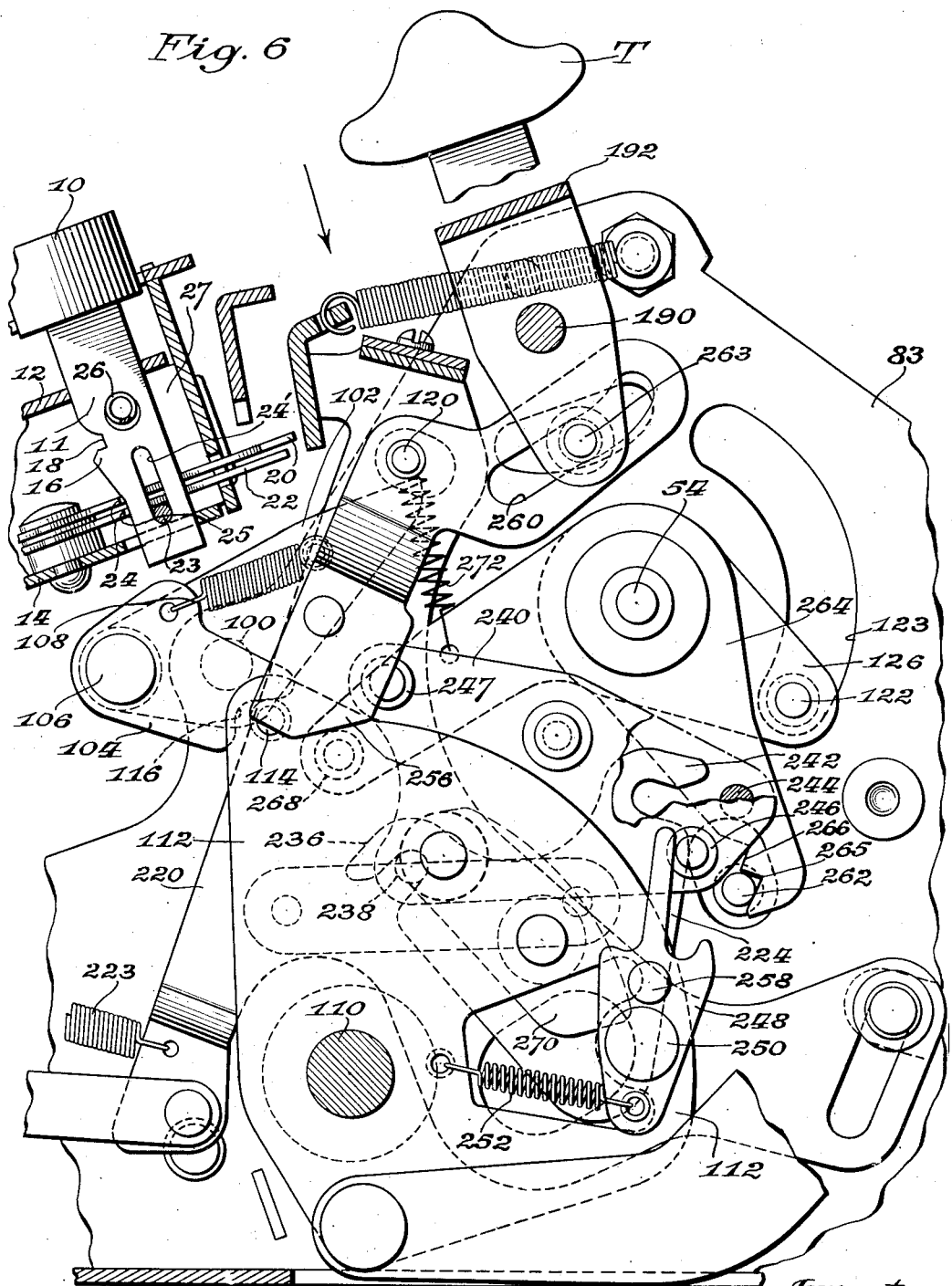

The shaft 100 is rotated clockwise by the mechanism best shown in Fig. 6. The shaft 100 has an arm 102 secured thereto, and this arm has a wipe pawl 104 pivotally secured thereto by a shouldered rivet 106, the pawl being held in the position shown in Fig. 6 by a tension spring 108. The main operating shaft 110 has a plate 112 rigidly secured thereto and the rearwardly extending finger of the wipe pawl 104 normally rests on a stud 114 which projects sidewardly from the plate 112. Thus during the initial portion of an operating cycle, as the main shaft 110 is rotated counterclockwise the stud 114 engages in the notch 116 of the wipe pawl 104, and swings the pawl clockwise, thereby, through a togglelike action, moving the arm 102 and the shaft 100 clockwise. As soon as the stud 114 wipes past the pawl 104, the arm 102 and shaft 100 are returned to normal position by a spring 118 (Fig. 1), the return movement being limited by the engagement of the rearward end of arm 102 with a fixed stud 120. Near the end of the operating cycle the stud 116 wipes freely past the pawl 104.

A restoring bail rod 122 extends through arcuate slots 124 formed in all of the type segments 50 and through similar slots 123 and 125 formed in the frame plates 83 and 85, respectively.

The right-hand end of the restoring bail rod 122 is secured to an arm 126 fixed to shaft 54 (Fig. 6) while the left-hand end thereof is secured to an arm 128 (Fig. 2) likewise fixed to the shaft 54 and having a segmental pinion 130 formed thereon, the latter meshing with a segmental gear 132 pivoted on a shaft 134. A bifurcated operating arm 136 is likewise pivoted on the shaft 134 and is riveted to the segmental gear 132.

An operating plate 138 is rigidly secured to the main operating shaft 110 and carries a roller 140 which cooperates with the inwardly facing edges 142 and 143, as well as with the slot 144 in the bifurcated arm 136. It will be apparent that as the main shaft is rocked clockwise (Fig. 2) during the forward stroke of the operating handle, the roller 140 will not move the arm 136 until the roller engages in the notch 144, when it commences swinging the arm 136 counterclockwise, thereby rotating the shaft 54 clockwise (Fig. 2) and thus permitting such of the type segments 50 which are free to move, to rotate counterclockwise (Fig. 1).

A repeat key R (Fig. 2) has a stem 146 pivoted on a fixed stud 148, and has an offset depending arm 150 having a sidewardly projecting stud 152, the latter extending through an arcuate slot 154 in the side frame plate, the slot being illustrated in phantom in Fig. 2.

The key stem 146 has a cam nose 156 which is engaged by a roller 158 on a detent arm 160. The detent arm 160 is pivoted on a stud 162 and the roller 158 is held in engagement with the wedge shaped nose 156 by a suitably anchored tension coil spring 164. When the repeat key is swung forwardly (clockwise Fig. 2), its depending offset arm 150 engages a sidewardly projecting lug 166 formed on a wipe pawl 168 pivoted on a pin 170 projecting sidewardly from a bail arm 172, the latter being pivoted on a stud 174. A key release bail bar 176 is secured to the arm 172 and has its other end secured to an arm 178 (Fig. 7) pivoted on a stud 180. The plate 138 (Fig. 2) carries a roller 182 for cooperation with the pivoted wipe pawl 168. During the forward operating stroke, the pin merely wipes past and pivots the pawl against the tension of its normalizing spring 184, but on the return stroke the roller 182 engages the forward edge of the wipe pawl and due to the overhanging lug 166 swings the bail arm 172 clockwise (Fig. 2), causing the bail bar 176 thereof to engage the rearwardly projecting ends of the slides 20 and 22, thereby releasing the depressed numeral keys just prior to the completion of the return stroke of the operating handle. When, however, the repeat key R is swung forwardly, its offset arm 150 engages the lug 166 and swings the wipe pawl 168 counterclockwise a sufficient distance to keep it out of the path of the roller 182 and thus prevents restoration of the set keys to normal position and permits a repeat operation.

A total key T has a stem 188 pivoted on a stud 190 (Figs. 4 and 5) and has an inverted U-shaped bracket 192 riveted thereto. The stem 188 has a V-shaped notch 194 formed therein for engagement by the point 195 of a key lock plate 196 which is pivoted on a fixed stud 198. The plate has a sidewardly extending stud 200 which is adapted to be engaged by the edge of a plate cam 202 fixed to the main shaft 110 and by the hook portion 204 of an arm 206 which is pivoted on the shaft 110 and is permitted but limited movement with respect to the cam plate 202 by virtue of having a pin 208 projecting sidewardly into an arcuate slot 210 formed in the plate 202.

A tension spring 212 has one end secured to the stud 208 and the other end secured to a stud 214 fixed to plate 202, and the arm 206 is thereby urged to move clockwise with respect to the plate 202 (Fig. 7). During the initial portion of the forward stroke of the operating handle, the cam plate 202, by engaging the stud 200, swings the lock plate 196 clockwise to cause its point 195 to enter into the notch 194 if the total key T is in normal position, or to engage the key stem surfaces directly above the notch when the key stem is swung counterclockwise as shown in Fig. 4, for a total taking operation, and engages the surface directly below the notch 194 when the total key T is swung rearwardly as shown in Fig. 5, for conditioning the machine for a subtotaling operation.

The right-hand accumulator supporting arm 70 has a stud 216 secured thereto and projecting through an opening 218 formed in an operating arm 220 which is pivoted on a fixed stud 222 and is urged clockwise by a suitably anchored tension spring 223. A double hook arm 224 is pivoted on the stud 216 and is connected to the operating arm 220 by a link 226. The operating arm 220 has an offset depending arm 228 formed integrally therewith and this arm carries a stud 230 which projects through a V-shaped slot formed in the depending arm 234 of bracket 192. When the total key T is in normal position as shown in Fig. 6, the forward hook 236 of the arm 224 is in engagement with a stud 238 formed on a rocker plate 240, whereas when the key T is in its total taking position (Fig. 4) or in subtotal taking position (Fig. 5) the rear hook 242 is engaged with a stud 244 likewise secured to the rocker plate 240. The rocker plate 240 also has a pair of sidewardly extending roller studs 246 and 247 which are adapted to be engaged by a double acting wipe pawl 248 pivoted on a stud 250 carried by the plate 112, and is biased to project radially outwardly with respect to the main shaft 110 by a tension spring 252. Upon the forward operating stroke, the wipe pawl 248 engages stud 246 and swings the rocker plate 240 counterclockwise, thereby through the engagement of the hook 236 with the stud 238, moving the arm 224 and hence the accumulator supporting bail downwardly to disengage the accumulator pinions 66 from the segmental gears 60. Shortly after the commencement of the return stroke, the wipe pawl 248 engages the roller stud 247 and rocks the rocker plate 240 clockwise to bring the accumulator pinions into mesh with their segmental gears 60, thereby to cause the amounts set up in the keyboard to be added into the accumulator in the well known manner.

When the key T is swung forwardly for a total taking operation (Fig. 4), it swings the actuator plate 220 counterclockwise about its pivot 222 to the position shown in Fig. 4. This movement, through the link 226, causes the arm 224 to be shifted to the position in which its hook 242 engages the stud 244. When the wipe pawl, during the initial portion of the forward stroke, engages the stud 246 and swings the rocker plate counterclockwise, it will therefore raise the arm 224 and thereby bring the accumulator pinions into mesh with their segmental gears 60, thereby causing the movement of the actuators to be limited by the engagement of the zero stop hook portion 92 (Fig. 1) with the transfer cam teeth 74 of the accumulator and permit taking of a total in the usual manner.

At the beginning of the return stroke of the operating handle, the wipe pawl 248, by engagement with the roller stud 247, causes disengagement of the accumulator pinions so that they remain in cleared or zero position.

When the key T is swung rearwardly (clockwise) to the position in which it is shown in Fig. 5 for a subtotal operation, the operating arm 220 is swung to the same position as it assumes in the total taking position, and the parts operate in the manner above described except that at the beginning of the return stroke the wipe pawl 248 is prevented from engaging the roller stud 247 by virtue of the fact that an arm 256 engages a stud 258 on the wipe pawl 248.

The arm 256 is pivoted on stud 222 and has an elongated slot 260 formed therein. The upper portion of this slot is arcuate with the stud 199 as its center, while the lower portion is straight. The bracket 192 attached to the stem 188 of key T has a stud 263 projecting into the slot 260. The arm 256 is therefore not moved when the key T is swung forwardly, as shown in Fig. 4, but is pivoted counterclockwise when the key T is swung rearwardly to the position in which it is shown in Fig. 5.

Since the lower end of the arm 256 prevents engagement of the wipe pawl 248 with the roller stud 247, the rocker plate 240 is not moved on the return stroke and the accumulator pinions remain enmeshed with the segmental gears and are returned to their initial positions, retaining the total.

The right-hand accumulator arm 70 has a stud 262 projecting therefrom through a suitable opening in the frame plate, and this stud is adapted to be engaged by a detent bell crank 264 having a pair of V notches 265 and 266. The forwardly and downwardly extending arm of the ball crank lever carries a roller 268 which is adapted to engage a cam plate 270 which is riveted to the plate 112 (Fig. 6). By virtue of the interference provided by the plate 270, the bell crank detent 264 is prevented from moving and the accumulator pinions are thereby locked in or out of mesh during that portion of the operating cycle in which the cam 270 lies beneath the roller 268.

A suitably anchored tension spring 272 tends to move the detent bell crank 264 clockwise so as resiliently to hold the V notch 265 or 266 thereof in engagement with the stud 262.

Referring to Figs. 4 and 5, the key T is biased to move to its intermediate normal position by a suitably anchored tension spring 274. The stud 263 attached to the total key bracket 192 projects through a suitable opening in the side frame plate and into a radial elongated slot 276 (Fig. 3) formed in a signal printing sector 278 having a type bar 280 secured thereto, this bar having a type "T" 282 and a type "S" 283 thereon. As will be apparent from Figs. 4 and 5, when the key T is swung forwardly, it brings the "T" type 282 in printing position, whereas when the total key is swung rearwardly for a subtotal operation, it brings the type "S" 283 in printing position.

Whenever the key T is moved to total or subtotal taking position, it swings the operating arm 220 counterclockwise about its pivot 222 by virtue of the operating connection of the stud 230 in the V-slot 232. The arm 220 has a projection 284 which engages the key release bail bar 176 when the arm 220 is swung counterclockwise, and pushes the bar 176 forwardly a sufficient distance to engage the ends of the key latching bars 20 and the ends of the actuator release bars 22, moving them forwardly, thereby releasing any depressed numeral keys 10 and releasing all the actuator slides, so that they may move rearwardly in the total and subtotal taking operations. The key T may therefore be used as an error key.

A bail comprising an arm 286 (Fig. 2) pivoted on stud 148, an arm 288 (Fig. 7) pivoted on the stud 148, and a toothed cross bar 290, is normally held in the position shown in Fig. 7 by a stud 292 on the key lock plate 196. When, as previously described, the lock plate swings clockwise, the stud 292 moves to a position beneath a rounded notch 294 in the arm 288 to permit the bail 288, 290 to be swung downwardly by its tension spring 296 thereby permitting the teeth on the lower edge of the cross bar to engage the forward edges of sidewardly extending lugs 298 formed at the ends of the latching bars 20. The key latching bars 20 being thus locked in their rearward positions, all the numeral keys 10 are locked against depression.

Referring to Fig. 5, it will be noted that the downwardly projecting arm of the operating plate 220 is connected by a pivoted link 300 with an arm 302 secured to a shaft 304. As shown in Fig. 1, the shaft 304 has a flattened portion upon which a latch 306 rests, the latch being pivoted on an annularly grooved stud 308. The latch 306 has a hooked end 310 which engages behind a sidewardly bent lug 312 formed on the leftmost actuator 36. This actuator is not connected to a stop slide 30 since it is provided to operate only during total and subtotal taking operations. It will be understood that there is one more accumulator pinion, with its operating and printing mechanisms, than there are banks or longitudinal rows of keys to provide for the addition and printing of the units carried over from the highest order numeral key controlled accumulator pinion.

Means are provided to prevent printing of the zeros in the denominational orders higher than that of the highest significant figure in the total. This means comprises a hook 318 (Figs. 1, 4, and 5) for each type segment 50 being adapted to engage a lug 320 extending sidewardly from the type segment. The hooks 318 are pivoted on a rod 322 and are carried in a frame also pivoted on the rod 322, comprising end plates 324 and 325 which are joined by combs 326 and 327 and a cross bar 328, the combs serving as guides and locators for the hooks 318. The hooks are biased to swing counterclockwise by tension springs 330, and each hook has an offset forwardly extending arm 332, the extremity of which is adapted to enter the notch 77 in the disc 66 of such accumulator pinion assemblies as are in zero position.

Each of the arms 332 has a sidewardly bent ear 334 which extends beneath the arm 332 of the next adjacent lower denominational order. This elimination of zero printing is to be effected only during total and subtotal operating cycles, and the frame comprising the plates 324 and 325 and its connecting combs and bars is operated so as to swing the hooks 318 out of the path of the lugs 320 during adding operations. This is accomplished by means of a stud 336 projecting sidewardly from the frame plate 325 and through a slot 338 formed in the rearwardly projecting portion of the actuator arm 220.

It will therefore be seen that when the key T is swung either forwardly or rearwardly for a totaling or subtotaling operation, the frame comprising the plates 324 and 325 and connecting combs is swung counterclockwise so as to bring the hooks 318 into operative position.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a calculating machine having a key board, differentially movable actuators controllable by amounts set up in the key board, an accumulator comprising pinions engageable with the actuators, operating mechanism including a double acting wipe pawl to cause engagement and disengagement of the accumulator and the actuators, and a main operating shaft having a forward and a return stroke; the combination of a pivoted key movable in one direction from its normal position to cause the operating mechanism to effect a total taking operation and movable in the opposite direction to cause the mechanism to effect a subtotal taking operation, resilient means holding the key in its normal position, an element forming an operating connection between the key and the operating mechanism, a connection between the key and the element to cause the element to move in the same direction when the key is moved in either direction from its normal position thereby to cause the operating mechanism to be positioned for engaging the accumulators and actuators during the forward stroke of the main shaft and disengaging the accumulator from the actuators on the return stroke thereof, and an arm operatively connected to the total key and moved thereby only when the key is moved to subtotal taking position to interfere with the operation of the wipe pawl during the return stroke of the main shaft to prevent the operating mechanism from disengaging the accumulator from the actuator.

2. In a calculating machine having a key board, differentially movable actuators controllable by amounts set up in the key board, an accumulator comprising pinions engageable with the actuators, operating mechanism including a double acting wipe pawl to cause engagement and disengagement of the accumulator and the actuators, and a main operating shaft having a forward and a return stroke; the combination of a pivoted key including a stem having two adjacent projections and movable in one direction from its normal position to cause the operating mechanism to effect a total taking operation and movable in the opposite direction to cause the mechanism to effect a subtotal taking operation, resilient means holding the key in its normal position, an element forming an operating connection between the key and the operating mechanism, a connection between the key and the element to cause the element to move in the same direction when the key is moved in either direction from its normal position thereby to cause the operating mechanism to be positioned for engaging the accumulators and actuators during the forward stroke of the main shaft and disengaging the accumulator from the actuators on the return stroke thereof, an arm operatively connected to the total key and moved thereby only when the key is moved to subtotal taking position to interfere with the operation of the wipe pawl during the return stroke of the main shaft to prevent the operating mechanism from disengaging the accumulator from the actuator, and means connected to the main shaft and operated throughout the major portions of the forward and return stroke thereof to engage between or at opposite sides of the projections on the key stem and thereby lock the key against movement.

3. In a calculating machine having a key board, differentially movable actuators controllable by amounts set up in the key board, an accumulator comprising pinions engageable with the actuators, operating mechanism including a double acting wipe pawl to cause engagement and disengagement of the accumulator and actuators, and a main operating shaft having a forward and a return stroke; the combination of a pivoted key including a stem having a V-shaped slot and movable in one direction from its normal position to cause the operating mechanism to effect a total taking operation and movable in the opposite direction to cause the mechanism to effect a subtotal taking operation, resilient means holding the key in its normal position, an element having a pin embraced in the V-shaped slot forming an operating connection between the key and the operating mechanism, said pin and V slot connection causing the element to move in the same direction when the key is moved in either direction from its normal position thereby to cause the operating mechanism to be positioned for engaging the accumulators and actuators during the forward stroke of the main shaft and disengaging the accumulator from the actuators on the return stroke thereof, and an arm operatively connected to the total key and moved thereby only when the key is moved to subtotal taking position to interfere with the operation of the wipe pawl during the return stroke of the main shaft to prevent the operating mechanism from disengaging the accumulator from the actuator.

THOMAS O. MEHAN.

REFERENCES CITED

The following references are of record in the file of this patent:

UNITED STATES PATENTS

| Number | Name | Date |
|---|---|---|
| 851,089 | Hinchman | Apr. 23, 1907 |
| 968,004 | Vincent | Aug. 23, 1910 |
| 1,208,190 | Monroe | Dec. 12, 1916 |
| 1,296,380 | Fuhrmann et al. | Mar. 4, 1919 |
| 1,305,124 | Kuentzler | May 27, 1919 |
| 1,318,798 | Quentell | Oct. 14, 1919 |
| 1,386,021 | Peters | Aug. 2, 1921 |
| 1,432,616 | Phinney | Oct. 17, 1922 |
| 1,706,726 | Brand | Mar. 26, 1929 |
| 1,915,296 | Crosman | June 27, 1933 |
| 2,052,905 | Sturm | Sept. 1, 1936 |
| 2,055,522 | Dicke | Sept. 29, 1936 |
| 2,059,458 | Hosack | Nov. 3, 1936 |
| 2,091,728 | Clark | Aug. 31, 1937 |
| 2,091,778 | Garbell | Aug. 31, 1937 |
| 2,263,818 | Payne | Nov. 25, 1941 |